United States Patent [19]

Hughes et al.

[11] 3,758,605

[45] Sept. 11, 1973

[54] PROCESS

[75] Inventors: Robert D. Hughes; Edward F. Steigelmann, both of Park Forest, Ill.

[73] Assignee: Standard Oil Company, Chicago, Ill.

[22] Filed: Sept. 13, 1972

[21] Appl. No.: 288,781

Related U.S. Application Data

[63] Continuation-in-part of Ser. No. 252,607, May 12, 1972.

[52] U.S. Cl.............. 260/677 A, 55/158, 208/308
[51] Int. Cl....................... C07c 11/02, B01d 53/22
[58] Field of Search.................... 260/677 A, 679 A, 260/681.5 C, 676 A; 55/16, 158; 208/308

[56] References Cited
UNITED STATES PATENTS

| | | | |
|---|---|---|---|
| 3,396,510 | 8/1968 | Ward et al. | 55/16 |
| 3,335,545 | 8/1967 | Robb et al. | 55/16 |
| 3,172,741 | 3/1965 | Jolley | 55/16 |
| 3,256,675 | 6/1966 | Robb | 55/16 |

*Primary Examiner*—Delbert E. Gantz
*Assistant Examiner*—Juanita M. Nelson
*Attorney*—John W. Behringer, Martin J. Brown et al.

[57] ABSTRACT

There is described the separation of aliphatically-unsaturated hydrocarbons from mixtures by the combined use of liquid barrier permeation and metal complexing techniques. The liquid barrier is within a hydrophilic film membrane, and the barrier contains complex-forming metal ions in aqueous solution. The metal ions may be, for example, noble metal, nickel, mercurous, cuprous or other metal ions, and mixtures of these metal ions, with or without other cations, may be used. The separation of ethylene from ethane and methane is of particular interest.

24 Claims, No Drawings

PROCESS

This application is a continuation-in-part of our copending application, Ser. No. 252,607, filed May 12, 1972.

This invention relates to the separation of aliphatically-unsaturated hydrocarbons from mixtures containing the hydrocarbons to be separated along with other material. More particularly, this invention is concerned with the separation of aliphatically-unsaturated hydrocarbons by the combined use of liquid barrier permeation and metal complexing techniques wherein the liquid barrier containing complex-forming metal ions is within a hydrophilic semi-permeable membrane. The invention is also directed to the composited metal-containing membranes in both dry and aqueous forms. The invention is especially useful for separating ethylene from gaseous mixtures containing it, other hydrocarbons, for example, one or both of ethane and methane, and with or without hydrogen.

There is considerable commercial interest in separating aliphatically-unsaturated hydrocarbons from mixtures containing them. These aliphatically-unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene, butadiene and isoprene are well known. These olefins, as well as other unsaturated materials, for instance, acetylene, are also used to form relatively low molecular weight products.

The aliphatically-unsaturated hydrocarbons are most often made available on a commercial basis in admixture with other chemical compounds, frequently other hydrocarbons. These unsaturated hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is frequently the case with hydrocarbons of the same number of carbon atoms or having a difference of only one carbon atom, distillation may not be an attractive separation procedure. In such cases, more expensive processes are often used and involve operations such as solvent extraction or extractive distillation which entail considerable expense, if indeed they are technically feasible in a given situation.

When the mixture containing the aliphatically-unsaturated hydrocarbon is essentially in a gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but, nevertheless, the mixture must be cooled in order to separate one or more of its components. In spite of the considerable cost of cryogenic operations, the procedure has been employed commercially for the separation of ethylene from other gaseous materials such as ethane and methane.

Our copending patent application cited above is directed to a method for separating aliphatically-unsaturated hydrocarbons from mixtures containing them, and involves the combined use of liquid barrier permeation and metal complexing techniques which can exhibit high selectivity factors. In the process the liquid barrier is an aqueous solution containing metal ions which will complex with the aliphatically-unsaturated hydrocarbon to be separated, and the liquid barrier is employed in conjunction with a semi-permeable member which is essentially impermeable to the passage of liquid. The present invention is directed to a system of this type and employs within a hydrophilic semi-permeable film membrane the liquid barrier containing the complex-forming metal ions. In this manner, there is no need to maintain contact of the film with a separate or contiguous aqueous liquid phase during the process, thereby facilitating the use of a greater variety of semi-permeable members as far as physical configuration is concerned. Thus, the membranes can be designed without the hindrance of having to provide a separate liquid phase adjacent the film, and this may enable the use of film configurations having a greater surface or contact area. The membranes of this invention are fairly stable, have satisfactory permeability and exhibit good selectivity for separating the aliphatically-unsaturated hydrocarbons.

In systems for conducting these separations in which the aqueous liquid is disposed as a distinct liquid phase on the feed side of the semi-permeable membrane, there is the disadvantage of having to introduce the hydrocarbon mixture into the liquid phase thereby reducing the effective rate or selectivity of the separation. Alternatively, the aqueous liquid phase has been held in contact with a semi-permeable membrane by absorbing the liquid in a porous solid such as filter paper, and holding the wet paper next to the semi-permeable membrane in a sandwich-type cell contruction. The physical limitations of this system are unattractive, especially since the sandwich construction cannot easily be made in shapes which afford a sufficiently high surface area of film to provide good separation rates. Thus, the flow or separation capacity of these systems may make them economically less advantageous than non-sandwich constructions. The method of the present invention and the semi-permeable membranes used therein, overcome these disadvantages and offer high separation rates for a given investment in equipment. Moreover, the invention avoids the necessity for maintaining a separate liquid aqueous phase in the system, and the contact of the aqueous phase and the feed mixture containing the aliphatically-unsaturated hydrocarbon to be separated can thereby be facilitated. The film membranes of this invention can thus be homogenous materials which are suitable for forming into various shapes. Thus, the membranes may be formed by, for instance, extrusion and can be made into hollow fiber membranes. These fibers are preferred membrane configurations because they have the advantages of high surface area per unit volume, thin walls for high transport rates, and high strength to withstand large pressure differentials across the membrane or fiber walls. Sandwich membranes cannot readily be fabricated into the hollow fiber form.

The procedure of the present invention may be employed alone to separate one or more unsaturated hydrocarbons, or it may be used in conjunction with other separating steps, for instance, a cryogenic operation, and still be economically advantageous compared with an all-cryogenic system. Although the aliphatically-unsaturated hydrocarbon product provided by the method of this invention may be a quite pure material, for instance, of greater than 99 percent purity, the separation procedure may be used merely to provide a significant increase in the concentration of a given aliphatically-unsaturated hydrocarbon in a mixture with other components of the feedstock.

The process of this invention can be employed to separate various aliphatically-unsaturated hydrocarbons from other ingredients of the feed mixture providing at least one of the aliphatically-unsaturated hydrocarbons exhibits a complexing rate or transfer rate across the liquid barrier that is greater than at least one other dissimilar or different component of the feedstock. Quite advantageously, the system can be used to separate aliphatically-unsaturated hydrocarbons from other hydrocarbons which may be aliphatically saturated or aliphatically unsaturated, or from non-hydrocarbon materials, including fixed gases such as hydrogen. The feed mixture may thus contain one or more paraffins, including cycloparaffins, mono or polyolefins, which may be cyclic or acyclic, and acetylenes or alkynes, and the mixture may include aromatics having such aliphatic configurations in a portion of their structure. Often, the feed mixture contains one or more other hydrocarbons having the same number of carbon atoms as the unsaturated hydrocarbon to be separated or only a one carbon atom difference. Among the materials which may be separated according to this invention are ethylene, propylene, butenes, butadiene isoprene, acetylene and the like.

In the method of the present invention, the mixture containing the aliphatically-unsaturated hydrocarbon to be separated may be essentially in the gaseous or vapor phase when in contact with the liquid barrier having dissolved therein one or more metal ions which form a complex with the unsaturated hydrocarbon. The liquid barrier is within and thus in contact with a hydrophilic semi-permeable membrane which may be permeable to the aliphatically-unsaturated hydrocarbon-containing mixture in the absence of the liquid barrier. The semi-permeable member may, for instance, be a film or membrane of the type that has been employed heretofore for the separation or purification of various chemical materials. Such films are disclosed in U.S. Pat. Nos. 3,335,545 and 3,447,286, herein incorporated by reference, and are often polymer gels, including hydrogels. The liquid barrier can be placed within the semi-permeable membrane in a number of ways, and the membrane can be said to immobilize the liquid barrier within the membrane. The liquid barrier is in essence completely within the semi-permeable structure, and the liquid does not pass from the membrane to an excessive extent under the conditions of operation. The membrane is, however, selectively permeable in the presence of the liquid barrier to the component of the feedstock to be separated. Since there is little, if any, passage for the feedstock across the separation zone except by becoming part of or reacting with the liquid barrier, this liquid barrier controls the selectivity of the liquid barrier-semi-permeable membrane combination.

The liquid barrier contains sufficient water and soluble metal ions to form a suitable complex with at least one aliphatically-unsaturated hydrocarbon component of the feed subjected to the separation procedure. The metal ions readily form the complex upon contact with the feed, and, in addition, the complex dissociates back to the metal ion and an aliphatically-unsaturated hydrocarbon component of the complex, under the conditions which exist on the discharge side of the liquid barrier and semi-permeable membrane as employed in this invention. The released aliphatically-unsaturated hydrocarbons exit the discharge side of the membrane and can be removed from the vicinity of the barrier and its supporting structure as by a sweep gas or through the effect of vacuum on this side of the barrier. Thus, the unsaturated hydrocarbon-metal complex forms and is decomposed in the complex metal ion-containing liquid barrier, and as a result the material passing through the barrier is more concentrated with respect to at least one aliphatically-unsaturated hydrocarbon component present in the feed stream.

Often, the reactivity of aliphatically-unsaturated hydrocarbons with the complexing metal ions in their order of decreasing activity goes from acetylenes or dienes to monoolefins, the aliphatically-saturated hydrocarbons and other materials present being essentially non-reactive. Also, different reactivities may be exhibited among the various members of a given type of aliphatically-unsaturated hydrocarbons. The process of this invention can thus be used to separate paraffins from monoolefins, diolefins or acetylenes; diolefins from monoolefins; or acetylenes from paraffins, monoolefins or diolefins; as well as to separate a given aliphatically-unsaturated hydrocarbon from another of such materials in its class where the members have differing complexing rates with or transport rates across the liquid barrier. The feed need only contain a small amount of aliphatically-unsaturated hydrocarbon, as long as the amount is sufficient so that the unsaturated material to be separated selectively reacts with the metal ions to a significant extent, and thus at least one other component of the feed is less reactive or non-reactive with the complex-forming metal ions.

The aliphatically-unsaturated materials of most interest with regard to separation by the method of the present invention, have two to about eight carbon atoms, preferably two to four carbon atoms. The separation of aliphatically-unsaturated materials from admixtures containing other gaseous materials, such as the separation of ethylene or propylene from admixtures with other normally gaseous materials, e.g. one or more of ethane, propane, and methane and hydrogen, is of particular importance. Frequently, such feed mixtures for the process contain about 1 to 50 weight percent ethylene, about 0 to 50 weight percent ethane and about 0 to 50 weight percent methane. Another process that may be of special significance is the separation from ethylene of minor amounts of acetylene.

The partial pressure of the aliphatically-unsaturated component of the feed at the input side of the liquid barrier used in the present invention is greater than the partial pressure of this unsaturated hydrocarbon on the discharge or exit side of the liquid barrier-semi-permeable membrane composite. This pressure drop of the unsaturated hydrocarbon to be separated may often be at least about 0.5 pound per square inch, and is preferably at least about 20 psi, although the pressure drop should not be so great that the liquid barrier is ruptured or otherwise deleteriously affected to a significant extent. Conveniently, the total pressure of the feed is up to about 1000 pounds per square inch. The discharge partial pressure of the unsaturated hydrocarbon can preferably be controlled by subjecting the exit side of the liquid barrier to the action of a sweep gas that may be essentially inert to forming a complex with the metal ions in solution in the liquid barrier. The sweep gas picks up the discharged aliphatically-unsaturated components, and the sweep gas may be selected so that it can be readily separated from the aliphatically-unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier-semi-permeable film composite employed in the method of this invention can be essentially constant or it may vary, and decomposition of the metal-unsaturated hydrocarbon complex can be effected primarily by the drop in partial pressure of the aliphatically-unsaturated hydrocarbon on the exit side of the liquid barrier compared with the partial pressure on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often, the temperature may be up to about 100° C., and elevated temperatures may even be desired to put the feedstock in the gaseous or vapor phase. Neither the temperature nor the pressure used should, however, be such as to destroy the difference in transport rate across the liquid barrier, semi-permeable film composite of the aliphatically-unsaturated hydrocarbons whose separation is sought, compared with that of the other components of the feed. These conditions should also not be such that physical disruption of the liquid barrier or any other significant malfunction results.

In the present invention we have found that those metals which can serve in the form of metal-containing cations to separate aliphatically-unsaturated hydrocarbons in the feed mixture through the formation of metal complexes of desired properties include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g. nickel and iron. Others of the useful complex-forming metals are in the second and third transition series, i.e. having atomic numbers from 39 to 47 or 57 to 79, as well as mercury, particularly as the mercurous ion. Thus, we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier within the semi-permeable member in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically-unsaturated hydrocarbon-containing feed to form an insoluble material which could block the film membrane or otherwise prevent the separation of the desired component of the feedstock. Also, in a given system, the metal is selected so that the complex will readily form and yet be sufficiently unstable so that the complex will decompose and the dissociated hydrocarbon leave the liquid barrier, thereby providing a greater concentration of the aliphatically-unsaturated hydrocarbon to be separated from the exit side of the membrane than in the feed. The concentration of the metal ions in the liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention are cuprous ions, ammonium ions can be used to provide copper ammonium complex ions which are active to form a complex with the aliphatically-unsaturated hydrocarbons to be separated. We preferably supply about equimolar amounts of cuprous and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a noble metal for complexing the aliphatically-unsaturated hydrocarbon in the process of this invention, we may also employ mixtures of noble metal and other cations. Our work has shown that as the noble metal concentration increases the selectivity of the desired separation may be enhanced, and we have also established that a portion of the noble metal may be replaced by non-noble metal or ammonium ions and selectivities generally comparable to those obtained with the same concentration of noble metal ions may be obtained. This result has been reached even though the non-noble metal or ammonium ion when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations not containing a noble metal will generally be less expensive, and, accordingly, the noble metal may be as little as about 10 molar percent or less of the total cations in the solution. To reduce expenses at least about 10 molar percent, preferably at least about 50 molar percent, of the total cations may be other than the noble metal cations. The non-noble or base metals are preferably of Groups II TO VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound, such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus, small or minor amounts of water, say as little as about 5 weight percent, on a salt-free basis in the liquid phase may serve to provide significant transport for the aliphatically-unsaturated hydrocarbons across the liquid barrier. Any other liquid present in the barrier is preferably water-miscible and should be chosen as not to have a substantial deleterious effect on the separation to be accomplished.

In the system of the present invention, the aqueous barrier is within a hydrophilic film membrane, and the amount of complex-forming metal in the semi-permeable membrane may vary considerably but is sufficient to accomplish the desired separation. Often this is a minor amount, say, about 1 to 50 weight percent, of the weight of the membrane on a non-aqueous basis, preferably about 5 to 25 weight percent. A preferred procedure for placing the solution of complex-forming metal in the semi-permeable film is by contacting the film with the solution and exerting a differential pressure across the solution and film. Thus, the pressure behind the solution is greater than that on the opposite side of the film, and as a result, the solution is forced into the film under pressure. Conveniently, the pressure on the solution is above atmospheric and the opposite side of the film is essentially at atmospheric pressure. The pressure differential need not be large, for instance, it may only be at least about 5 or 10 psi, and it should not be so great that the film is ruptured. This procedure could also be used to reactivate films which have been used to the extent that they have lost selectivity.

The membrane containing the complex-forming metal may be handled and transported in a more or less non-aqueous form or with some water therein, for instance, an insufficient amount of water to be effective in the separation. In such case, water would be added to the membrane to give a film bearing sufficient water to be useful in performing the separation process of the invention. During use of the membrane, the amount of water present is usually not so great as to give a substantial distinct or separate aqueous phase on the feed inlet side of the membrane. The film membrane can be wetted initially, and if it has a tendency to dry during use, additional water can be placed in the film while it is used on-stream to separate the unsaturated hydrocarbon, for instance, by inclusion of moisture in the hydrocarbon feed charged to the system. Alternatively, but less advantageously, the operation can be stopped for addition of water to the film. The water could be added at intervals by stopping the feeding of the hydrocarbon to the system, and charging water to the membrane at such times. In any event, care should be taken to insure that the film membrane during use is not so dry that it will exhibit non-selective permeability to the components of the feed and will thereby not serve to increase the concentration of an aliphatically-unsaturated hydrocarbon charged to the system.

The film membrane employed in the process of this invention to contain the liquid barrier is of the essentially solid, water-insoluble, hydrophilic, semi-permeable type. In the absence in the film of the liquid containing the complex-forming ions, the film is not adequately selective with respect to the passage of or permeation by the aliphatically-unsaturated hydrocarbon to perform the desired separation. Often, the film is permeable to essentially all of the components in the feedstock used in this invention when they are in the gaseous phase. However, by having the film contain sufficient aqueous liquid to form a barrier the simple diffusion of gas through the film is reduced or prevented, and the components of the feed stream must therefore traverse the film primarily by becoming part of and then being separated from the aqueous liquid phase contained in the film. Thus, in the absence of the complexing metal ion in the aqueous medium, there could be a slight separation of hydrocarbons effected by the use of water as the liquid medium since the individual hydrocarbons may exhibit differing solubilities in water. In the method of the present invention, however, the selectivity of the separation of aliphatically-unsaturated hydrocarbons is greatly increased due to the presence of the complexing metal ions in the aqueous barrier medium in the film. Also, during use in the process of this invention, the membrane has sufficient of the aqueous medium so that adequate metal ions are in solution, or at least react as if they are, to perform the desired separation.

The film membranes which can be employed in this invention serve to prevent the simple diffusion of significant amounts of liquid materials through the film under the conditions at which the operation is conducted. Since an aqueous medium is employed in this system, the film exhibits hydrophilic characteristics and is essentially unreactive with at least some of the complexing ions in the liquid barrier. The films can be readily made and some are commercially available. The film membranes are preferably self-supporting and have sufficient strength not to require any additional supporting material on either of its sides during use. With some films, however, it may be necessary, advantageous or convenient to provide adequate support such as additional film or sheet-like materials on one or both sides of the film membrane. These supporting structures are frequently very thin materials and may be permeable to both liquids and gases and not serve a separating function with respect to any component of the feed stream. Alternatively, the supporting film may be permeable to gases but not to liquids.

The semi-permeable membrane composites employed in this invention may be made by a variety of procedures. For example, the membrane can be formed and then the aqueous solution containing the complex-forming metal ions absorbed into the film. Rather than add the aqueous liquid complexing solution to the semi-permeable membrane after it is formed, we may add the solution to the membrane-forming medium. Subsequently, the membrane can be made from this medium and the complex-forming metal ions are held within the membrane. Combinations of these means for adding the complexing solution to the membrane may also be used, and the membrane is sufficiently hydrophilic to hold the solution within the membrane. This hydrophilic property may be present in the film membrane due to the character of the polymer forming the film or due to the presence of additives such as hygroscopic agents in the film which contribute to the hydrophilic nature of the composite. Both the polymer and additive may contribute hydrophilic properties, and a combination of a hydrophilic film and a hygroscopic agent may be advantageously employed. The film membrane may be considered sufficiently hydrophilic to be used in the present invention if it absorbs at least about 5 weight percent of water when immersed in distilled water for one day at room temperature and pressure.

Suitable membranes for use in this invention include those which are in essence polymer gels, including hydrogels, formed from solutions containing the complex-forming ions. These polymer gels are exemplified by gels of the polyurethane type. Thus, we may react essentially hydrocarbon polyisocyanates, especially predominantly diisocyanate materials, with an aliphatic polyol, and preferably the latter has more than two hydroxyl groups per average molecule so that the polymer film is cross-linked sufficiently to give a membrane of adequate strength. The polyisocyanates often have about four to 20, preferably about six to 12, carbon atoms per molecule, and may be aliphatic, including cycloaliphatic, aromatic or mixed structures of these types. The polyol is preferably, but not necessarily, water-soluble, and often the polyol may have a molecular weight of at least about 100. Suitable polyols include the polyvinyl alcohols, polyoxyethylene alcohol ethers, cellulose and its hydroxyl-containing derivatives and hydroxylated polymethacrylates and polyacrylates. If desired, in making the polyurethanes, the polyisocyanate and polyol may be reacted in approximately stoichiometric amounts; however, either reactant may be in excess, especially the polyol, since free polyol remaining may serve as a hygroscopic agent.

The film membrane may be in any useful physical shape. Flat film sheet is one form, although greater surface areas and more efficient separation may be provided by using tubular fibers of the types disclosed in, for instance, U.S. Pat. No. 3,228,877, herein incorporated by reference. This patent describes a variety of hydrophilic hollow fibers which may be employed in the present invention. The more hydrophobic polymers may be made sufficiently hydrophilic by the incorporation of materials which increase the affinity of the polymers for water. The useful membranes include, for example, those of cellulose acetate, polyesters, nylon, polyvinyl chloride, polyvinyl alcohols, polyvinyl acetate, polystyrene, cation exchange resins such as divinylbenzene cross-linked, sulfonated polystyrenes, olefin polymers such as polyethylene, polypropylene and ethylene-propylene copolymers, polyurethanes, ethylene-vinyl acetate copolymers, ethylene-ethyl acrylate copolymers, silicone elastomers and the like. Other suitable membranes are described in "Gas Permeability of Plastics," Major et al., Modern Plastics, page 135 et. seq., July, 1962; and U. S. Pat. Nos. 3,133,132; 3,133,137; 3,256,675; 3,274,750; 3,325,330; 3,335,545; 3,396,510 and 3,447,286, all incorporated herein by reference. The film membranes may often have a thickness up to about 30 mils or more, and we prefer to employ membranes having a thickness up to about 10 mils. The films must have sufficient thickness to avoid rupture at the pressures employed and often the films may have a thickness of at least about 0.001 mil.

We may composite the membrane in a manner so that the film has increased hydrophilic properties, and, preferably, a reduced tendency to lose water from the membrane during the performance of the separation. Thus, the film can be composited with a water-soluble or water-insoluble hygroscopic agent in a small amount effective to accomplish these purposes, and a film which might otherwise have properties that are too hydrophobic to contain the aqueous liquid barrier within the film, may be made sufficiently hydrophilic to be useful in the method of this invention by the use of the hygroscopic agent. The hydroscopic agent may improve the permeability of the film and aid in maintaining its physical strength when it is swollen with the aqueous liquid barrier. Also, the hygroscopic agent may improve the selectivity of the film in the olefin separation process. The hygroscopic agents include polymers such as polyvinyl alcohols, polyacrylic acids, polyvinyl ethers, polyoxyalkylene glycols and their carboxylic acid esters, and the like. Non-polymeric hygroscopic agents include ethylene glycol, glycerol and propylene glycol, and the agents may also be alkylated carboxycellulose derivatives such as methyl and ethyl carboxycellulose. Thus, the agents are frequently composed essentially of carbon, hydrogen and oxygen, and, for instance, may be polyols, polyethers, polyether esters, and the like. The hygroscopic agents should not unduly deleteriously affect the complex-forming reaction in the system of this invention or react with the film membrane in a disadvantageous manner. Thus, the agent should not cause precipitation of the complex-forming metal or make it inactive, or dissolve the polymer film. When used, the hygroscopic agents are often present in the film in minor amounts, say about 0.1 to 40 weight percent based on the total weight of the semi-permeable membrane without this agent and the liquid aqueous complexing solution. Preferably, this amount ia about 1 to 20 weight percent, although in some situations the hygroscopic agent is preferably used in greater amounts. Thus, in the use of composites of nylon and polyvinyl alcohol, preferred compositions may contain about 25 to 75 weight % of each of these materials, more preferably about 35 to 55 percent polyvinyl alcohol and about 45 to 65 percent nylon.

The method of this invention will be described further with reference to the following specific examples.

EXAMPLES 1 AND 2

In illustrating the direct incorporation of the complexing solution in a gel membrane during its formation, a gel (hereinafter designated as Gel A) was made by mixing 1 liquid part of a 12 weight percent solution of water-soluble polyvinyl alcohol in dimethylsulfoxide (DMSO) which was 1 molar in silver nitrate, and 1 liquid part of a 20 weight percent solution of toluene diisocyanate in DMSO. This mixing occurred in a flat-bottomed receptacle. After 20 minutes the mixture gelled, and the gel was removed from the bottom of the receptacle and washed with water. The gel had formed as a hydrophilic film of 15 to 20 mils thickness, and was stored between two pieces of filter paper until it was used as Gel A as indicated below.

Another gel was made in a similar manner except no silver nitrate was contained in the polyvinyl alcohol-containing, gel-forming mixture. After the gel was made it was water washed and blotted dry. The film was then immersed in a 1 molar aqueous solution of silver nitrate for two days. The membrane, designated Gel B below, was removed from the solution and blotted dry.

EXAMPLES 3 AND 4

A test cell was divided into upper and lower compartments by locating either the Gel A film or the Gel B film horizontally across the cell. The cell internal cross-sectional area was 3.8 cm.$^2$ and the cross-section was fully covered by the film membrane in a manner to provide an effective membrane area of 2.2 cm.$^2$. The main body of the cell had a height of 41 mm. and a gas outlet at each end. A feed inlet tube entered the upper end of the cell and opened about 5 mm. above the film, and a sweep gas inlet tube entered the lower end of the cell and opened about 1 mm. below the film. A humidified hydrocarbon feed was charged under pressure into the upper portion of the cell at the rate of 10 ml./min. and into contact with the membrane, and the exhaust or raffinate components of the gas left the cell by the upper outlet. The feed rate was considered to be sufficient to maintain a constant gas composition on the inlet side of the membrane. A sweep gas ( 10 ml./min. of helium) contacted the lower surface of the membrane, picked-up the materials permeating the membrane and then exited the cell by the lower outlet as a product stream. The product was analyzed by gas chromatography with the helium serving as the carrier gas. Permeation rates were calculated from the amount of hydrocarbon in the carrier gas, the carrier gas flow rate, and the response of the gas chromatographic detector to one milliliter of the product gas mixture. The tests were at ambient temperature.

The results of these tests are given in Table I. The data show the selectivity of the system for separating ethylene.

EXAMPLE 5

A membrane was made by dissolving 5 parts by weight of Elvamide 8061 nylon resin (DuPont), which is an alcohol-soluble polyamide, and 0.50 part by weight of water-soluble polyvinyl alcohol in 94.5 parts by weight of DMSO. The mixture was warmed to dissolve the polymer and then cast onto a glass plate using a 6 mil Bird applicator. The resulting film was dried for 30 minutes in an oven at 45°C. The film was then quenched in distilled water and kept immersed for 20 hours. The film was dried with filter paper, and soaked in a 6 normal aqueous silver nitrate solution for two hours. The hydrophilic film was removed from the solution, dried and then tested in an apparatus similar to that described in Example 3.

The hydrocarbon feed used in the test was saturated with water vapor and charged to the cell at 10 psig and at a rate of 25 ml./min. Nitrogen was used as the sweep gas to remove the permeate, and the results were as follows:

TABLE II

| | % $CH_4$ | % $C_2H_4$ | % $C_2H_6$ | % $C_3H_8$ | % Olefins |
|---|---|---|---|---|---|
| Feed | 13.39 | 31.80 | 22.59 | 32.22 | 64.02 |
| Permeate | 2.90 | 52.25 | 4.79 | 40.07 | 92.32 |

The selectivity factor for olefins obtained in the test was 6.75.

EXAMPLE 6

A membrane was made by dissolving 27 grams of Elvamide 8061 nylon resin (DuPont) and 3 grams of water-soluble polyvinyl alcohol in 120 ml. of DMSO. The mixture was warmed to 200°F. to dissolve the polymer, and then cast onto a glass plate using a 6 mil Bird applicator. The resulting film was partially dried for a minute in a vacuum oven at 85°C., 15 inches of vacuum and 500 ml./min. of air. The film was then quenched in a 0.5 percent $NaNO_3$ brine. The hydrophilic film was removed from the brine, dried and then tested in an apparatus similar to that described in Example 3.

In the test, 0.5 ml. of 5N $AgNO_3$ was placed on top of the membrane. The cell was closed and pressurized on the feed side to 20 psig. After several hours the $AgNO_3$ solution had been forced into the film. The hydrocarbon feed used in the test was humidified with water vapor and charged to the cell at 10 psig initially

TABLE I

| Gel | Inlet gas pressure (p.s.i.g.) | Permeation rate (ml./cm.$^2$ min.) | Composition of permeate (weight percent, He-free) | | | S.F.[1] |
|---|---|---|---|---|---|---|
| | | | Percent, $CH_4$ | Percent, $C_2H_4$ | Percent, $C_2H_6$ | |
| | (Feed composition) | | 21.1 | 46.4 | 32.5) | |
| A | 50 | 3.8×10$^{-4}$ | 4.6 | 85.0 | 10.4 | 9.8 |
| B | 30 | 1.3×10$^{-2}$ | 0.35 | 99.0 | 0.65 | 106.5 |

[1] S.F. = selectivity factor = ratio of permeation of ethylene compared with that of methane and ethane.

Each film performed the desired separation and the better performance of Gel B may be due to a loss of silver nitrate from Gel A during washing.

and then at 20 psig, all at a rate of 25 ml./min. Humidified nitrogen was used as the sweep gas to remove the permeate. The results were as follows:

TABLE III

| Time Since Start-up (Min.) | Pressure (psig) | Permeation Rate (ml./cm.$^2$ min.) | Composition of Permeate, Wt. % ($N_2$-free) | | |
|---|---|---|---|---|---|
| | | | %CH$_4$ | %C$_2$H$_4$ | %C$_2$H$_6$ |
| (Feed | — | — | 18.8 | 50.8 | 30.4) |
| 28 | 10 | 0.0018 | 0.085 | 99.51 | 0.407 |
| 36 | 10 | 0.0042 | 0.228 | 99.37 | 0.397 |
| 63 | 10 | 0.0057 | 0.086 | 99.82 | 0.097 |
| 90 | 10 | 0.0043 | 0.130 | 99.78 | 0.094 |
| 97 | 10 | 0.0050 | 0.068 | 99.87 | 0.065 |
| 114 | 20 | 0.0143 | 0.190 | 99.69 | 0.120 |
| 160 | 20 | 0.0099 | 0.047 | 99.92 | 0.031 |
| 167 | 20 | 0.0100 | 0.084 | 99.83 | 0.083 |
| 180 | 20 | 0.0108 | 0.064 | 99.88 | 0.054 |
| 200 | 20 | 0.0098 | 0.149 | 99.65 | 0.198 |

EXAMPLE 7

A 20 mil. film of sodium cellulose xanthate was cast onto a clean glass plate by using a 10 weight % aqueous mixture. The film was coagulated by placing the coated glass plate in a 0.18 molar hydrochloric acid bath for 30 minutes. The film was washed repeatedly with distilled water and allowed to dry to the touch. A portion of this gel membrane was placed in an aqueous solution of 6 molar silver nitrate containing 5 weight percent of water-soluble polyvinyl alcohol. The hydrophilic membrane remained in the solution for 2 hours and was then blotted to dry. The resulting gel membrane is designated Gel C hereinbelow.

EXAMPLE 8

Ethylene glycol monomethacrylate was polymerized according to the procedure given by Refojo and Yasuda in Journal of Applied Polymer Science, Vol 9, page 2427 (1965). The polymer was dissolved in methanol to give a 10% solution. A portion of the solution was formed as a 15–20 mil. film on the bottom of a flat-bottomed dish, and the solvent was allowed to evaporate. A portion of the film was soaked in a 1 molar aqueous silver nitrate solution for 24 hours. The hydrophilic membrane was then blotted dry and tested as Gel D as described below.

EXAMPLES 9 AND 10

Each of the gel membranes made as described in Examples 7 and 8 was tested for its suitability in separating ethylene from a mixture also containing methane and ethane. The test cell was similar to that described in Example 3. The feed gas was passed through water at 100°F. and supplied to the cell at the rate of 10 ml./min. under pressure. The purge or sweep gas was helium which was used at the rate of 10 ml./min. The results of the tests showed that both films were effective for separating ethylene and were as follows:

TABLE IV

| Gel | Feed pressure (p.s.i.g.) | Permeation rate (ml./cm.$^2$ min.) | Permeate composition, wt. percent (helium free) | | | S.F. |
|---|---|---|---|---|---|---|
| | | | CH$_4$ | C$_2$H$_4$ | C$_2$H$_6$ | |
| | (Feed composition | | 22.3 | 41.8 | 35.9) | |
| C | 10 | 18.4×10$^{-3}$ | 0.2 | 99.3 | 0.5 | 171 |
| D | 20 | 7.3×10$^{-3}$ | 0.7 | 98.4 | 0.9 | 80 |

EXAMPLE 11

Two divinylbenzene-cross-linked, sulfonated polystyrene cation exchange resin membranes having a thickness of 45 to 50 mils (Ionics, Inc. 61AZL-065, Membrane 1, and 61AZL-183, Membrane 2) were soaked in a 6 M AgNO$_3$ aqueous solution for at least 2 hours. The membranes were removed from the AgNO$_3$ solution and blotted dry. Each of the membranes was placed in a test cell similar to that of Example 3. The permeability and selectivity of the silver ion-containing membrane in the separation of ethylene was determined using a feed gas mixture of methane, ethylene, and ethane. The feed gas was supplied under 30 psig pressure at the rate of 10 ml./min. Humidification of the feed gas was attained by passing it through a water bubbler at 125°F. before entering the test cell. The permeate through the membrane was purged from the cell with a 10 ml./min. stream of helium. The results from these tests are summarized in Table V.

TABLE V

| Membrane No. | Permeate Composition, Wt. % | | | S.F. | Permeation Rate ml.-mil./cm.$^2$-min. |
|---|---|---|---|---|---|
| | Methane | Ethylene | Ethane | | |
| (Feed | 18.5 | 50.8 | 30.6 | | |
| 1 | 0.2 | 99.5 | 0.3* | 241 | 0.21 |
| 2 | 0.8 | 97.5 | 1.7* | 33 | 0.056 |

*Estimated

EXAMPLE 12

Several General Electric XD-1 silicone polycarbonate resin fibers of approximately 10 mils o.d. and 1 mil wall thickness were dip-coated in a 10 percent aqueous solution of polyvinyl alcohol to provide a hydrophilic film supported on the hydrophobic XD-1 resin fibers. The fibers were treated with a 30 percent acetone-in-water mixture for 45 seconds before coating was attempted. An even coating was assured by withdrawing the fibers from the coating solution at a controlled rate of 1.25 in./min. Several dips were made to assure complete coverage of the fiber. After coating was complete, the fibers were placed in a sodium sulfate saturated aqueous solution containing 5 percent hydrochloric acid for at least 18 hours. The hydrochloric acid acted to crosslink the coating and render it insoluble in water. The fibers were then washed repeatedly with distilled water to remove all of the salt. After drying, six of the fibers were assembled into a hollow fiber membrane unit. The ends of the fibers were potted in General Electric's RTV-616 silicone resin which was then cured. The fiber ends were reexposed by cutting off a small portion of the resin and fibers. The 6 resultant fibers were 21 cm. long and 11 mil o.d. This gave an effective membrane area of 9.9 cm$^2$ for the unit. The fibers were impregnated with a 1M AgNO$_3$ aqueous solution by filling the assembled cell with AgNO$_3$ and applying a pressure to the feed side to force some of the AgNO$_3$ into the fiber coating. The excess AgNO$_3$ was then drained from the cell.

To illustrate the usefulness of the coated fibers having the AgNO$_3$ solution impregnated therein, the cell was supplied with a 10 ml./min. stream of feed gas under a pressure of 20 psig. The feed gas contained methane, ethylene, and ethane. The inside of the fibers was continually purged with a 10 ml./min. stream of nitrogen which picked up the gas that permeated the fibers. The composition of this stream was determined by vapor phase chromatographic analysis. Table VI summarizes the data gathered in this experiment. This data represent the average of 19 measurements taken over a 7.5 hour period.

TABLE VI

| | Permeate Composition, Wt. % | | | S.F. | Permeation Rate ml./ cm.$^2$-min. |
|---|---|---|---|---|---|
| | Methane | Ethylene | Ethane | | |
| (Feed | 17.2 | 50.1 | 32.7) | — | — |
| Permeate | 2.4 | 92.2 | 5.4 | 11.8 | 0.034 |

EXAMPLE 13

A blend of 40 gms. of formaldehyde-alcohol modified 6:6 nylon (BCI-819, Belding Chemical Industries), 60 gms. of polyvinyl alcohol and 120 ml. of DMSO was made as an extrusion mix, by first mixing the dry polymers and then adding the DMSO. The resulting slurry was heated in an extruder feed tank at 250°F. for 1.5 hours to melt the polymers and degas the blend for extrusion. Extrusion of the mixture was conducted under a nitrogen pressure between 200 and 1000 psi on the feed tank and with the extruder head at 170°F. Hollow fibers of the polymer blend were formed through an annular die having an opening of 0.070 inch. During extrusion, air was blown through the center of the fiber. After extrusion the fibers were stretched to 25 to 75 percent of their original length by applying a controlled stress to the fibers while heatin them to 150°–200°F. The stretched fibers were crosslinked by immersion in a 3 percent p-toluenesulfonic acid in 10 percent aqueous sodium sulfate bath for 90 minutes at 50°–60°C. The fibers were then washed repeatedly with water to remove the salt from them and allowed to dry.

The ends of three of these fibers were then potted together in a 2½ by ¼ inch O.D. stainless steel tube with Armstrong's C-4 epoxy resin. The resin was cured with Armstrong's Activator "D" by heating the resin-activator mixture at 80°C. for 60 minutes. The other ends of the fibers were potted similarly in a different tube. Potting was done in such a manner such that removal of a small amount of the potting compound could be done to expose open ends of each of the fibers.

The potted fiber bundle was allowed to soak for 16 hours in a 6M AgNO$_3$ solution. The fiber bundle was assembled into a hollow fiber test cell in which the fibers had a total membrane area of 23.4 cm.$^2$. This cell was then supplied with a pressurized 10 ml./min. stream of a mixture of ethylene, ethane, and methane. The feed was supplied to the outside of the fibers and was humidified by bubbling it through water at 145°F. before reaching the cell. The inside of the fibers was continually purged with a 10 ml./min. stream of helium which picked up any material which permeated the fibers. A gas chromatographic analysis of the purge stream was used to determine the permeation rate of and selectivity to ethylene of the fibers. As can be seen from Table VII, the unit successfully separated ethylene from the feed mixture.

TABLE VII

| Pressure, PSIG | Permeate Composition (Wt. %, He-free) | | | S.F. | Permeation Rate ml./ cm.$^2$-min. |
|---|---|---|---|---|---|
| | Methane | Ethylene | Ethane | | |
| (Feed | 18.1 | 50.2 | 31.7) | — | — |
| 5 | 0.15 | 99.85 | 0 | 695 | 8.59×10$^{-4}$ |
| 10 | 0.12 | 99.88 | 0 | 840 | 1.22×10$^{-3}$ |
| 20 | 0.15 | 99.73 | 0.12 | 351 | 1.70×10$^{-3}$ |

These data show the advantageous characteristics of using in the process of this invention film membranes having substantial amounts of both nylon and polyvinyl alcohol. Such films often contain about 25 to 75 weight % of each of these components, preferably about 45 to 65 weight percent of nylon and 35 to 55 weight percent of polyvinyl alcohol.

It is claimed:

1. A method for separating aliphatically-unsaturated hydrocarbon of 2 to about 8 carbon atoms which comprises contacting a mixture containing said unsaturated hydrocarbon with a first side of an essentially solid, water-insoluble, hydrophilic, semi-permeable membrane having therewithin an aqueous liquid barrier having metal ions which combine with said unsaturated hydrocarbon to form a water-soluble complex, the partial pressure of said unsaturated hydrocarbon on a second side of said semi-permeable membrane being sufficiently less than the partial pressure of said unsaturated hydrocarbon in said mixture to provide separated unsaturated hydrocarbon on said second side of said semi-permeable membrane, and removing separated unsaturated hydrocarbon from the vicinity of said second side of said semi-permeable membrane.

2. A method for separating aliphatically-unsaturated hydrocarbon of two to four carbon atoms which comprises contacting a vaporous mixture containing said aliphatically-unsaturated hydrocarbon with a first side of an essentially solid, water-insoluble, hydrophilic, semi-permeable membrane having therewithin an aqueous liquid barrier, said semi-permeable membrane being permeable to said vaporous mixture in the absence of said aqueous liquid, said liquid barrier having metal ions which combine with said unsaturated hydrocarbon to form a water-soluble complex, the partial pressure of said unsaturated hydrocarbon on a second side of said semi-permeable membrane being sufficiently less than the partil pressure of said unsaturated hydrocarbon in said vaporous mixture to provide separated unsaturated hydrocarbon on said second side of said semi-permeable membrane, and removing separated unsaturated hydrocarbon from the vicinity of said second side of said semi-permeable membrane.

3. The method of claim 2 in which said unsaturated hydrocarbon separated is ethylene.

4. The method of claim 3 in which said vaporous mixture contains ethylene and one or both of methane and ethane.

5. The method of claim 2 wherein water is added to the film while the separation proceeds.

6. The method of claim 5 wherein the added water is in said vaporous mixture.

7. The method of claim 6 wherein the unsaturated hydrocarbon separated is ethylene.

8. The method of claim 1 in which said metal ions are noble metal ions.

9. The method of claim 8 in which said noble metal ions are silver.

10. The method of claim 9 in which the unsaturated hydrocarbon separated is ethylene.

11. The method of claim 10 in which said mixture contains ethylene and one or both of methane and ethane.

12. The method of claim 2 wherein the semi-permeable membrane contains polyvinyl alcohol.

13. The method of claim 2 wherein the semipermeable membrane is polyurethane, nylon, sodium cellulose xanthate or ethylene glycol monomethacrylate polymer.

14. The method of claim 13 wherein the semipermeable membrane contains polyvinyl alcohol.

15. The method of claim 14 wherein the semipermeable membrane is nylon.

16. The method of claim 13 wherein the unsaturated hydrocarbon separated is ethylene.

17. The method of claim 16 wherein the said vaporous mixture contains ethylene and one or both of methane and ethane.

18. The method of claim 17 in which said metal ions are silver.

19. The method of claim 18 wherein the semipermeable membrane contains nylon and polyvinyl alcohol.

20. The method of claim 1 wherein water is added to the film while the separation proceeds.

21. The method of claim 20 wherein the added water is in said vaporous mixture.

22. The method of claim 21 wherein said unsaturated hydrocarbon is ethylene and said vaporous mixture contains one or both of methane and ethane.

23. The method of claim 22 wherein said metal ions are silver.

24. The method of claim 23 wherein the semipermeable membrane contains nylon and polyvinyl alcohol.

* * * * *